United States Patent
Tanemura et al.

(10) Patent No.: US 9,699,308 B2
(45) Date of Patent: Jul. 4, 2017

(54) METHOD AND SYSTEM FOR PROCESSING AN INCOMING CALL

(75) Inventors: Tetsuo Tanemura, Kanagawaken (JP); Etsuo Ono, Kanagawa (JP)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 11/464,935

(22) Filed: Aug. 16, 2006

(65) Prior Publication Data
US 2008/0056472 A1 Mar. 6, 2008

(51) Int. Cl.
*H04M 1/60* (2006.01)
*H04M 3/42* (2006.01)

(52) U.S. Cl.
CPC ..... *H04M 3/42374* (2013.01); *H04M 1/6058* (2013.01); *H04M 1/6066* (2013.01)

(58) Field of Classification Search
CPC ............. H04M 1/6041; H04M 1/6058; H04M 1/6066; H04M 1/05; H04M 2250/02; H04M 3/54; H04M 3/42059; H04M 3/42348
USPC ....... 379/201.01, 211.01, 211.02; 455/569.1, 455/41.1, 41.2, 41.3, 569.2
See application file for complete search history.

(56) References Cited

U.S. PATENT DOCUMENTS

| | | | |
|---|---|---|---|
| 5,559,860 A * | 9/1996 | Mizikovsky | 455/413 |
| 2002/0045454 A1* | 4/2002 | Iwata | 455/450 |
| 2004/0174975 A1* | 9/2004 | Sylvain et al. | 379/211.01 |
| 2005/0053218 A1 | 3/2005 | Kim | |
| 2005/0215243 A1 | 9/2005 | Black et al. | |
| 2005/0239469 A1* | 10/2005 | Vallstrom et al. | 455/445 |

* cited by examiner

*Primary Examiner* — Antim Shah
(74) *Attorney, Agent, or Firm* — Morris & Kamlay LLP

(57) ABSTRACT

A method and system for processing an incoming call to an electronic communication device enables a response to an incoming call to be determined based on whether a peripheral device is operatively coupled to the electronic communication device. A first call processing profile is associated with a first peripheral device and a second call processing profile is associated with a second peripheral device. The method comprises determining that the first peripheral device is operatively coupled to the electronic communication device (step 210). The incoming call to the electronic communication device is then allowed to be processed according to the first call processing profile in response to the first peripheral device being operatively coupled to the electronic communication device (step 215).

20 Claims, 2 Drawing Sheets

METHOD AND SYSTEM FOR PROCESSING AN INCOMING CALL

FIELD OF THE INVENTION

The present invention relates generally to wireless communication devices, and in particular to processing an incoming call according to a call processing profile associated with a peripheral device.

BACKGROUND

Mobile telephones often include call processing features that enable incoming calls to be processed in different ways depending on an identity of a caller. For example, users are able to program some telephones so that incoming calls from specified telephone numbers are processed immediately so as to activate a ring tone, whereas calls from other telephone numbers are transmitted directly to a voice mail feature.

Further, some mobile telephones enable a user to change call processing features based on various circumstances. For example, some telephones can be programmed so that incoming calls received from specified telephone numbers can be processed differently depending on present circumstances such as a time of day, day of week, or location of a user. However, circumstances of telephone users often change, thus forcing users to reprogram call processing configurations based on anticipated circumstances that turn out to be inaccurate. For example, a user may have a telephone programmed to receive all calls from work associates during standard work hours; however, if the user then stays home sick during work hours the telephone may need to be reprogrammed to process calls from work associates differently, such as forwarding the calls to another telephone number or directing the calls to a voice mail feature.

SUMMARY OF THE INVENTION

According to one aspect, the present invention is a method for processing an incoming call to an electronic communication device, where a first call processing profile is associated with a first peripheral device and a second call processing profile is associated with a second peripheral device. The method comprises determining that the first peripheral device is operatively coupled to the electronic communication device. The incoming call to the electronic communication device is then allowed to be processed according to the first call processing profile in response to the first peripheral device being operatively coupled to the electronic communication device.

Embodiments of the present invention thus enable an electronic communication device to automatically determine how an incoming call will be processed based on whether a particular peripheral device is operatively coupled to the electronic communication device. Users of electronic communication devices can thus reliably change predetermined call responses to incoming calls from particular callers simply by switching from one peripheral device to another. Call processing profiles can be defined so that responses to calls from a particular caller can change depending on whether a particular peripheral device is operatively coupled to an electronic communication device. Users therefore do not need to remember to reprogram call processing profiles of an electronic communication device when changing from one circumstance to another, such as from a work environment to a home environment; rather, call responses are adjusted automatically based on whether one or more peripheral devices are operatively coupled to the electronic communication device.

BRIEF DESCRIPTION OF THE DRAWINGS

In order that the invention may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Figure 1:
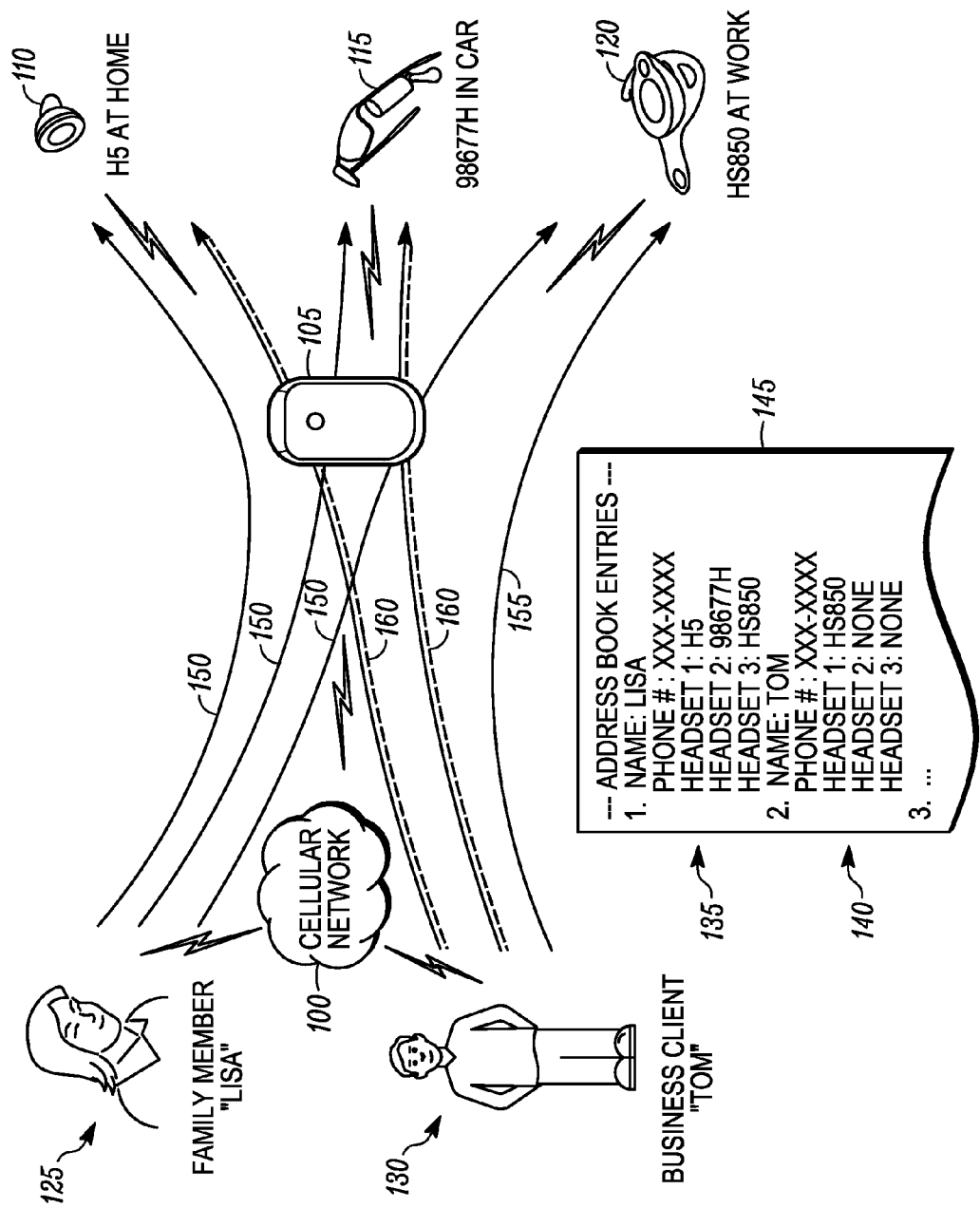
FIG. 1 is a schematic diagram illustrating processing of various incoming calls through a cellular network to an electronic communication device such as a mobile telephone, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method and system for processing an incoming call to an electronic communication device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIG. 1, a schematic diagram illustrates processing of various incoming calls through a cellular network 100 to an electronic communication device such as a mobile telephone 105, according to some embodiments of the present invention. Various peripheral devices, such as a first headset 110, a second headset 115, and a third headset 120 are illustrated as being capable of being operatively coupled to the mobile telephone 105. Incoming calls from a first caller 125 and from a second caller 130 are then processed at the mobile telephone 105 based on predefined call processing profiles and based on whether a particular peripheral device is operatively coupled to the mobile telephone 105.

For example, a first caller's call processing profile 135 associated with the first caller 125, such as a family member named Lisa, and a second caller's call processing profile 140 associated with the second caller 130, such as a business client named Tom, can be defined in an electronic address book listing 145 stored in the mobile telephone 105. The first caller's call processing profile 135 is further associated with each of the headsets 110, 115 and 120 and indicates that incoming calls from a telephone number associated with the first caller 125 should activate an incoming call alert associated with the mobile telephone 105 when any of the headsets 110, 115, and 120 are operatively coupled to the mobile telephone 105. Thus the solid arrows 150 leading from the first caller 125 to the headsets 110, 115, and 120, respectively, each indicate an incoming call from the first caller 125 that is received at the mobile telephone 105 and connected to one of the headsets 110, 115, 120.

The second caller's call processing profile 140 is further associated only with the third headset 120 and indicates that incoming calls from a telephone number associated with the second caller 130 should activate an incoming call alert at the mobile telephone 105 only if the third headset 120 is operatively coupled to the mobile telephone 105, and should not activate an incoming call alert if only the first headset 110 or the second headset 115 is operatively coupled to the mobile telephone 105. Thus the solid arrow 155 leading from the second caller 130 to the third headset 120 indicates an incoming call from the second caller 130 that is received at the mobile telephone 105 and connected to the third headset 120. The dashed arrows 160 leading from the second caller 130 to the first and second headsets 110, 115, respectively, each indicate an incoming call from the second caller 130 that is not connected to either the first or second headsets 110, 115, respectively, and does not activate an incoming call alert at the mobile telephone 105, because neither the first headset 110 nor the second headset 115 is associated with the call processing profile 140 associated with the second caller 130. According to some embodiments of the present invention, such incoming calls indicated by the dashed arrows 160 that are not connected to one of the headsets 110, 115 can be processed in various ways, such as forwarding the incoming calls to another electronic communication device at another telephone number or to a voice mail feature associated with the mobile telephone 105.

According to some embodiments of the present invention, a user of an electronic communication device is thus able to automatically determine how an incoming call will be processed by operatively coupling a particular peripheral device to the electronic communication device. For example, the user of the mobile telephone 105 may want to always receive calls from the first caller 125, such as the family member named Lisa, regardless of the activity or location of the user. Thus, for example, the first headset 110 is associated with the user's home, the second headset 115 is associated with the user's car, and the third headset 120 is associated with the user's work. The first caller's call processing profile 135 indicates that regardless which headset 110, 115, 120 is operatively coupled to the mobile telephone 105, incoming calls from the first caller 125 will always activate an incoming call alert, such as a ring tone or vibrator feature, associated with the mobile telephone 105. The second caller's call processing profile 140 indicates that the user of the mobile telephone 105 wants to have calls from the second caller 130, such as the business client named Tom, activate an incoming call alert only when the third headset 120, which is associated with the user's work, is operatively coupled to the mobile telephone 105.

Embodiments of the present invention therefore enable a response to an incoming call from a particular telephone number to be automatically determined based primarily on whether a particular peripheral device is operatively coupled to an electronic communication device. As described above, some telephones according to the prior art can be programmed so that incoming calls received from specified telephone numbers can be processed differently depending on present circumstances such as a time of day, day of week, or location of a user. But scheduling call responses based on particular times or days can require reprogramming if a user's schedule changes, and determining call responses based on location requires use of complex locating technology. Embodiments of the present invention can reliably and automatically determine an appropriate call response based primarily on coupling of a peripheral device.

Peripheral devices that can be operatively coupled to an electronic communication device and associated with a call processing profile, according to some embodiments of the present invention, can comprise various types of devices such as, for example, headsets, microphones, speakers, docking stations, cameras, routers, personal computers and other electronic communication devices. Those skilled in the art also will appreciate that an electronic communication device can comprise, according to some embodiments of the present invention, various types of electronic communication devices that can be operatively coupled to peripheral devices. Such various types of electronic communication devices include, for example, mobile telephones, personal digital assistants (PDAs) and notebook computers.

As will be appreciated by those skilled in the art, operative coupling of a peripheral device to an electronic communication device can occur using various techniques such as wired connections or wireless connections. Wireless connections can be made using various wireless protocols such as, for example, Bluetooth® (a registered trademark of the Bluetooth Special Interest Group, Inc.) protocols.

A peripheral device can be associated with a call processing profile in various ways. For example, a call processing profile can include a Medium Access Control (MAC) address, a product serial number, or a product model number of a particular peripheral device. For example, in FIG. 1, the third headset 120 is associated with the second caller's call processing profile 140 using the product model number "HS850" by which a manufacturer identifies the third headset 120. Alternatively, users of an electronic communication device can use a program application to define a call processing profile and can assign a nickname to a particular peripheral device. For example, the third headset 120 alternatively could be identified in the second caller's call processing profile 140 as "work headset".

Further, call processing profiles can be defined in various ways according to various embodiments of the present invention. The first caller's call processing profile 135 is only one example of a very simple profile that is based on an identification of the first caller 125 as listed in an electronic address book. An incoming call from the first caller 125 either activates an incoming call alert or does not activate such an incoming call alert based on whether a particular peripheral device is operatively coupled to the mobile telephone 105. In light of the present disclosure, as will be understood by those skilled in the art, more sophisticated call processing profiles are also possible.

For example, Boolean logic can be used to determine a response to an incoming call based on a combination of peripheral devices being operatively coupled to an electronic communication device, such as a particular headset and a particular docking station. Further, Boolean logic can be used to determine a response to an incoming call based on combinations of a particular coupled peripheral device and other factors such as a time of day, day of week, or location of a user. A call processing profile also can be based on a particular peripheral device and identify various incoming callers and appropriate call responses for each caller.

The second caller's call processing profile 140 illustrates a simple binary "receive/do not receive" call response. More sophisticated call processing profiles, according to some embodiments of the present invention, can comprise multiple response options for a given incoming call such as forwarding the call to one of various numbers, forwarding the call to a voice mail feature, or playing a specified ring back tone for a caller. Thus, according to some embodiments of the present invention, processing an incoming call according to a call processing profile can result in various types of responses such as, for example, activating a ring tone, forwarding the call to another number, forwarding the call to a voice mail feature, or playing a specified ring back tone.

Figure 2:
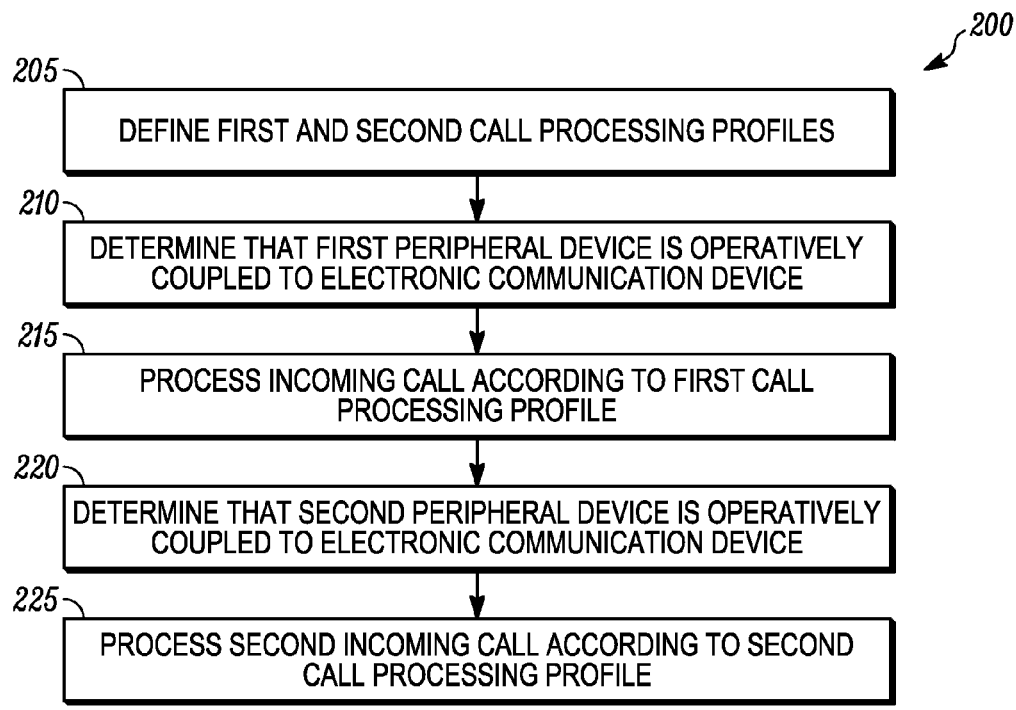
FIG. 2 is a general flow diagram illustrating a method for processing an incoming call to an electronic communication device, according to some embodiments of the present invention.

Referring to FIG. 2, a general flow diagram illustrates a method 200 for processing an incoming call to an electronic communication device, according to some embodiments of the present invention. At step 205, first and second call processing profiles are defined. For example, as shown in FIG. 1, the first caller's call processing profile 135 and the second caller's call processing profile 140 are defined using an electronic address book associated with the mobile telephone 105. After the first and second call processing profiles are defined, the first call processing profile is associated with a first peripheral device and the second call processing profile is associated with a second peripheral device. For example, as shown in FIG. 1, the first caller's call processing profile 135 is associated with the first headset 110, and the second caller's call processing profile 140 is associated with the third headset 120.

At step 210, it is determined that the first peripheral device is operatively coupled to the electronic communication device. For example, it may be determined that the first headset 110 is wirelessly coupled, using a Bluetooth® protocol, to the mobile telephone 105.

At step 215, the incoming call to the electronic communication device is allowed to be processed according to the first call processing profile in response to the first peripheral device being operatively coupled to the electronic communication device. For example, if the first headset 110 is wirelessly coupled to the mobile telephone 105, and because the first headset 110 is associated with the first caller's call processing profile 135 that is also associated with the first caller 125, an incoming call to the mobile telephone 105 from the first caller 125 is allowed to activate an incoming call alert associated with the mobile telephone 105. Similarly, if the first headset 110 is wirelessly coupled to the mobile telephone 105, and because the first headset 110 is not associated with the second caller's call processing profile 140 that is associated with the second caller 130, an incoming call to the mobile telephone 105 from the second caller 130 is allowed to be forwarded directly to a voice mail feature associated with the mobile telephone 105, and does not activate an incoming call alert.

At step 220, it is determined that a second peripheral device is operatively coupled to the electronic communication device and that the first peripheral device is no longer operatively coupled to the electronic communication device. For example, a user of the mobile telephone 105 may leave home and go to work. The user therefore leaves the first headset 110 at home, so that the first headset 110 is no longer wirelessly coupled to the mobile telephone 105 and, upon arriving at work, wirelessly couples the third headset 120, which is associated with the user's work, to the mobile telephone 105.

At step 225, a second incoming call to the electronic communication device is then allowed to be processed according to the second call processing profile in response to the second peripheral device being operatively coupled to the electronic communication device. For example, if the third headset 120 is wirelessly coupled to the mobile telephone 105, then an incoming call from the second caller 130 is allowed to activate an incoming call alert and be connected to the third headset 120, because the second call processing profile indicates that calls from the second caller 130 should be allowed to activate an incoming call alert when the third headset 120 is operatively coupled to the mobile telephone 105.

Figure 3:
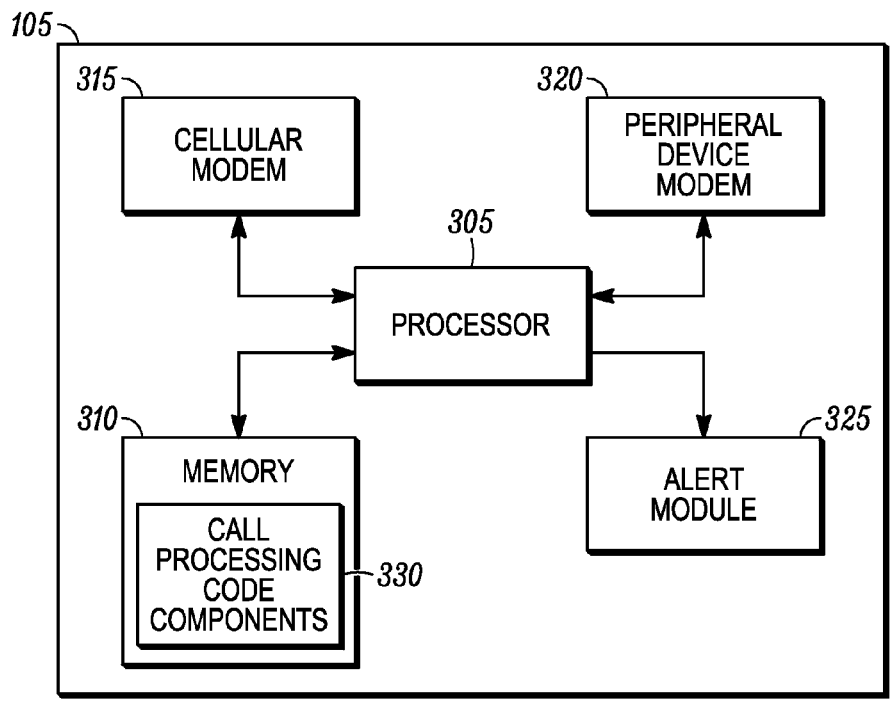
FIG. 3 is a block diagram illustrating components of an electronic communication device such as a mobile telephone, according to some embodiments of the present invention.

Referring to FIG. 3, a block diagram illustrates components of an electronic communication device such as the mobile telephone 105, according to some embodiments of the present invention. Those skilled in the art will recognize that the present invention can be embodied in a system of the mobile telephone 105. A system of the mobile telephone 105 can include a processor 305 such as a standard microprocessor or application specific integrated circuit (ASIC) operatively coupled to a memory 310. The processor 305 is also operatively coupled to a cellular modem that can communicate with the cellular network 100, and is operatively coupled to a peripheral device modem 320, such as a Bluetooth® modem, which can communicate with the headsets 110, 115 and 120. Further, the processor 305 is operatively coupled to an alert module 325, which can activate an incoming call alert such as a ring tone or a vibrator.

The memory 310 comprises a computer readable medium such as a random access memory (e.g., static random access memory (SRAM)), read only memory (e.g., programmable read only memory (PROM), or erasable programmable read only memory (EPROM)), or hybrid memory (e.g., FLASH) as is well known in the art. The medium then comprises incoming call processing computer readable program code components 330 that, when processed by the processor 305, are configured to cause the execution of the above described steps of the method 200.

Embodiments of the present invention thus enable an electronic communication device to automatically determine how an incoming call will be processed based on whether a particular peripheral device is operatively coupled to the electronic communication device. Users of electronic communication devices can thus reliably change predetermined call responses to incoming calls from particular callers simply by switching from one peripheral device to another. Call processing profiles can be defined so that responses to calls from a particular caller can change depending on whether a particular peripheral device is operatively coupled to an electronic communication device. Users therefore do not need to remember to reprogram call processing profiles of an electronic communication device when changing from one circumstance to another, such as from a work environment to a home environment; rather, call responses are adjusted automatically based on whether one or more peripheral devices are operatively coupled to the electronic communication device.

It will be appreciated that embodiments of the invention described herein may be comprised of one or more conventional processors and unique stored program instructions that control the one or more processors to implement, in conjunction with certain non-processor circuits, some, most, or all of the functions of processing an incoming call to an electronic communication device as described herein. The non-processor circuits may include, but are not limited to, a radio receiver, a radio transmitter, signal drivers, clock circuits, power source circuits, and user input devices. As such, these functions may be interpreted as steps of a method for processing an incoming call to an electronic communication device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

We claim:

1. A method for processing an incoming call to a mobile electronic communication device, where a first call processing profile is associated with a first peripheral device and a second call processing profile is associated with a second peripheral device, the method comprising:
    determining that the first peripheral device is operatively coupled to the mobile electronic communication device;
    allowing the incoming call, from a particular telephone number, to the mobile electronic communication device to be processed according to the first call processing profile in response to the first peripheral device being operatively coupled to the mobile electronic communication device;
    determining that the second peripheral device is operatively coupled to the mobile electronic communication device and that the first peripheral device is no longer operatively coupled to the mobile electronic communication device; and
    enabling different processing of a response to the incoming call from the particular telephone number to be automatically determined subject to different peripheral devices being operatively coupled to the mobile electronic communication device such that an incoming call alert occurs at the mobile electronic communication device specifically when one of the different peripheral devices is operatively coupled to the mobile electronic communication device and providing no incoming call alert when another of the different peripheral devices is also operatively coupled to the mobile electronic device, yet processing the incoming call in a manner different from the peripheral device configured to cause the incoming call alert.

2. The method of claim 1, further comprising:
    allowing a second incoming call to the mobile electronic communication device to be processed according to the second call processing profile in response to the second peripheral device being operatively coupled to the mobile electronic communication device.

3. The method of claim 1, wherein the first call processing profile is associated both with the first peripheral device and with the second peripheral device.

4. The method of claim 1, further comprising defining the first and second call processing profiles.

5. The method of claim 1, wherein the first and second peripheral devices comprise headsets.

6. The method of claim 1, wherein the first and second peripheral devices are devices selected from a group consisting of: headsets, microphones, speakers, docking stations, cameras, routers, personal computers and other electronic communication devices.

7. The method of claim 1, wherein the first call processing profile comprises instructions to forward incoming calls received at the mobile electronic communication device to another mobile electronic communication device.

8. The method of claim 1, wherein the first call processing profile comprises instructions to forward incoming calls received at the mobile electronic communication device to a voice mail feature associated with the mobile electronic communication device.

9. The method of claim 1, wherein the first call processing profile comprises instructions to play a specified ring back tone.

10. The method of claim 1, wherein allowing the incoming call to the mobile electronic communication device to be processed according to the first call processing profile is further in response to a combination of peripheral devices being operatively coupled to the mobile electronic communication device.

11. A system for processing an incoming call to a mobile electronic communication device, where a first call processing profile is associated with a first peripheral device and a second call processing profile is associated with a second peripheral device, the system comprising:
    computer readable program code configured to cause determining that the first peripheral device is operatively coupled to the mobile electronic communication device;
    computer readable program code configured to cause the incoming call, from a particular telephone number, to the mobile electronic communication device to be processed according to the first call processing profile in response to the first peripheral device being operatively coupled to the mobile electronic communication device;

computer readable program code configured to cause determining that the second peripheral device is operatively coupled to the mobile electronic communication device and that the first peripheral device is no longer operatively coupled to the mobile electronic communication device; and computer readable program code configured to enable different processing of a response to the incoming call from the particular telephone number to be automatically determined subject to different peripheral devices being operatively coupled to the mobile electronic communication device such that an incoming call alert occurs at the mobile electronic communication device specifically when one of the different peripheral devices is operatively coupled to the mobile electronic communication device and providing no incoming call alert when another of the different peripheral devices is also operatively coupled to the mobile electronic device, yet processing the incoming call in a manner different from the peripheral device configured to cause the incoming call alert.

12. The system of claim 11 further comprising:

computer readable program code configured to cause a second incoming call to the mobile electronic communication device to be processed according to the second call processing profile in response to the second peripheral device being operatively coupled to the mobile electronic communication device.

13. The system of claim 11, wherein the first call processing profile is associated both with the first peripheral device and with the second peripheral device.

14. The system of claim 11, further comprising computer readable program code configured to cause defining the first and second call processing profiles.

15. The system of claim 11, wherein the first and second peripheral devices comprise headsets.

16. The system of claim 11, wherein the first and second peripheral devices are devices selected from a group consisting of: headsets, microphones, speakers, docking stations, cameras, routers, personal computers and other electronic communication devices.

17. The system of claim 11, wherein the first call processing profile comprises instructions to forward incoming calls received at the mobile electronic communication device to another mobile electronic communication device.

18. The system of claim 11, wherein the first call processing profile comprises instructions to forward incoming calls received at the mobile electronic communication device to a voice mail feature associated with the mobile electronic communication device.

19. The system of claim 11, wherein the first call processing profile comprises instructions to play a specified ring back tone.

20. A system for processing an incoming call to a mobile electronic communication device, where a first call processing profile is associated with a first peripheral device and a second call processing profile is associated with a second peripheral device, the system comprising:

means for determining that the first peripheral device is operatively coupled to the mobile electronic communication device;

means for processing the incoming call to the mobile electronic communication device according to the first call processing profile in response to the first peripheral device being operatively coupled to the mobile electronic communication device;

means for determining that the second peripheral device is operatively coupled to the mobile electronic communication device and that the first peripheral device is no longer operatively coupled to the mobile electronic communication device; and means for enabling different processing of a response to the incoming call to be automatically determined subject to different peripheral devices being operatively coupled to the mobile electronic communication device such that an incoming call alert occurs at the mobile electronic communication device specifically when one of the different peripheral devices is operatively coupled to the mobile electronic communication device and providing no incoming call alert when another of the different peripheral devices is also operatively coupled to the mobile electronic device, yet processing the incoming call in a manner different from the peripheral device configured to cause the incoming call alert.

* * * * *